United States Patent

Utsunomiya et al.

[11] Patent Number: 6,051,363
[45] Date of Patent: Apr. 18, 2000

[54] METHOD FOR MAKING AN OPTICAL RECORDING MEDIUM

[75] Inventors: Hajime Utsunomiya; Masanori Kosuda; Hiroshi Shingai, all of Nagano, Japan

[73] Assignee: TDK Corporation, Tokyo, Japan

[21] Appl. No.: 09/000,952

[22] Filed: Dec. 30, 1997

[30] Foreign Application Priority Data

Jan. 10, 1997 [JP] Japan ................................. 9-014528

[51] Int. Cl.[7] .................................................. G11B 7/26
[52] U.S. Cl. ................ 430/270.13; 430/945; 430/273.1; 369/275.5; 369/275.2; 428/64.6; 428/694 GR; 428/64.4
[58] Field of Search ........................ 430/270.12, 270.13, 430/945, 273.1; 428/64.4, 64.6, 694 GR; 369/275.2, 275.5

[56] References Cited

U.S. PATENT DOCUMENTS

| | | | |
|---|---|---|---|
| 4,847,132 | 7/1989 | Takao et al. | 428/913 |
| 4,984,231 | 1/1991 | Yasuoka et al. | 430/270.13 |
| 5,395,735 | 3/1995 | Nagata et al. | 430/945 |
| 5,479,382 | 12/1995 | Nishida et al. | 369/275.2 |
| 5,688,574 | 11/1997 | Tamura et al. | 430/945 |

FOREIGN PATENT DOCUMENTS

| | | | |
|---|---|---|---|
| 0376700 | 7/1990 | European Pat. Off. | 430/270.13 |
| 63-103453 | 5/1988 | Japan . | |
| 1-017238 | 1/1989 | Japan | 430/270.13 |

*Primary Examiner*—Martin Angebranndt
*Attorney, Agent, or Firm*—Laubscher & Laubscher; R. J. Lasker

[57] ABSTRACT

A method for preparing an optical recording medium of phase change type is provided. This recording medium comprises a substrate, a recording layer, and a lower and an upper dielectric layers provided in direct contact with the recording layer. In this method, a step of an exposure treatment wherein the surface of the lower dielectric layer is exposed to an oxidative atmosphere is conducted after forming the lower dielectric layer on the substrate and before forming the recording layer on the lower dielectric layer. A step of a heat treatment wherein said lower dielectric layer is heat treated may be carried out in addition to the exposure treatment.

21 Claims, 1 Drawing Sheet

METHOD FOR MAKING AN OPTICAL RECORDING MEDIUM

BACKGROUND OF THE INVENTION

1. Field of the Invention

This invention relates to a phase change optical recording medium and a method for preparing such an optical recording medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystallographic state whereupon a fluctuation of reflectance by the crystallographic change is detected for reproduction of the information. Optical recording media of the phase change type are of great interest since they can be overwritten by modulating the intensity of a single light beam and the optical system of the drive unit used for their operation is simple as compared with magneto-optical recording media.

Most optical recording media of the phase change type used chalcogenite systems such as Ge-Te systems which provide a substantial difference in reflectance between crystalline and amorphous states and have a relatively stable amorphous state.

It was also recently proposed to use new compounds known as chalcopyrites.

Chalcopyrite compounds were investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228.

Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai (JP-A) Nos. 240590/1991, 99884/1991, 82593/1991, 73384/1991, and 151286/1992.

In addition to these phase change type optical recording media using chalcopyrite compounds, JP-A 267192/1992, 232779/1992, and 166268/1994 disclose phase change type optical recording media wherein an AgSbTe$_2$ phase forms when a recording layer crystallizes.

When information is recorded in the optical recording medium of phase change type, the laser beam applied is of high power (recording power) that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallizing temperature and lower than the melting temperature. The record mark to which the laser beam of erasing power is applied is heated to a temperature higher than the crystallizing temperature and then allowed to gradually cool to recover the crystalline state.

In the optical recording medium of phase change type, dielectric layers are generally formed on opposite sides of the recording layer. Requirements for the dielectric layers are:

(1) the dielectric layers should be capable of protecting the recording layer and the substrate from heat histerisis by laser beam irradiation;

(2) the dielectric layers should be capable of amplifying the reproduced signal by making use of optical interference effect of lights reflected from boundaries between the layers; and (3) the recording and erasing properties can be regulated by adjusting thermal conductivity and the like of each dielectric layer.

Typical dielectric layers which meet such requirements are those containing highly refractive ZnS as their main component. For example, Japanese Patent Application Kokai (JP-A) No. 103453/1988 discloses an optical information recording member having a dielectric layer containing a mixture of ZnS and SiO$_2$. The merits described therein include increase in sensitivity for the power of incident light upon recording, and increase in the number of erasing/overwriting operations of the dielectric material. The increase in the sensitivity is said to have been realized by optimizing thermal constant of the dielectric layer, and the increase in the number of erasing/overwriting operations is said to have been realized by preventing the alteration in the nature of the dielectric layer.

However, it has been found in the investigation of the inventors of the present invention that use of dielectric layers containing zinc sulfide for the dielectric layer of an optical recording medium of phase change type results in marked increase of jitter and drop of C/N upon repeated overwriting, and hence, in reduced number of overwritable operations. A TDS analysis of ZnS-SiO$_2$ dielectric layer revealed that the sulfur that had been incorporated in the dielectric layer as simple substance or dimer sulfur during the formation of the dielectric layer is released and sublimed when the dielectric layer is heated to about 400° C., which is approximately the melting point of the recording layer, and consequently, the sulfur from the dielectric layer diffuses into the recording layer to invite change in the composition of the recording layer. It is assumed that the increase in jitter and the drop in C/N upon repeated overwriting is caused by such mechanism which in turn invites decrease in erasing rate and unstabilization of the distance between the record marks.

SUMMARY OF THE INVENTION

Therefore, an object of the present invention is to increase the number of overwritable operations in the optical recording medium of phase change type.

Such an object of the present invention is attained by any one of the following (1) to (12).

(1) A method for preparing an optical recording medium comprising a substrate, a recording layer of phase change type, and a lower and an upper dielectric layers in direct contact with said recording layer, wherein a step of an exposure treatment wherein the surface of the lower dielectric layer is exposed to an oxidative atmosphere is conducted after forming the lower dielectric layer on the substrate and before forming the recording layer on the lower dielectric layer.

(2) The method according to the above (1) wherein said exposure treatment is conducted for more than 5 minutes.

(3) The method according to the above (1) or (2) wherein said exposure treatment is conducted at a relative humidity of up to 20%.

(4) A method for preparing an optical recording medium comprising a substrate, a recording layer of phase change type, and a lower and an upper dielectric layers in direct contact with said recording layer, wherein a step of an exposure treatment wherein the surface of the lower dielectric layer is exposed to an oxidative atmosphere and a step of a heat treatment wherein said lower dielectric layer is heat treated are conducted after forming the lower dielectric layer on the substrate and before forming the recording layer on the lower dielectric layer.

(5) The method according to the above (4) wherein said heat treatment is conducted at a temperature of 40 to 90° C.

(6) The method according to the above (4) or (5) wherein said heat treatment is conducted for more than 1 minute.

(7) The method according to any one of the above (4) to (6) wherein said heat treatment is conducted at a relative humidity of up to 20%.

(8) The method according to any one of the above (4) to (7) wherein said exposure treatment is conducted at a relative humidity of up to 20%.

(9) The method according to any one of the above (4) to (8) wherein said exposure treatment and said heat treatment are simultaneously conducted.

(10) The method according to any one of the above (1) to (9) wherein said lower dielectric layer is a dielectric layer containing zinc sulfide.

(11) The method according to any one of the above (1) to (10) wherein said recording layer contains Ge, Sb and Te.

(12) An optical recording medium prepared by the method of any one of the above (1) to (11).

In first aspect of the present invention, a step of exposure treatment wherein the surface of the lower dielectric layer is exposed to an oxidative atmosphere is conducted after forming the lower dielectric layer and before forming the recording layer. In second aspect of the present invention, a step of heat treatment is conducted after the step of the exposure treatment or simultaneously with the step of the exposure treatment.

In the present invention, the number of overwritable operations has been increased by including such step(s) after forming the lower dielectric layer. Although the mechanism for such increase in the number of overwritable operations is yet unclear, it has been estimated that such improvement has been realized by the oxidation of the lower dielectric layer surface as described below. That is, oxygen may become adsorbed on the surface of the lower dielectric layer during the exposure treatment to cause oxidation of the surface, and the subsequent formation of the recording layer on the lower dielectric layer invites formation of an oxidized layer at the boundary between the lower dielectric layer and the recording layer. This oxidized layer is estimated to avoid the diffusion of the free sulfur from the lower dielectric layer to thereby avoid the change in the composition of the recording layer. Increase in jitter and drop in C/N caused by the repeated overwriting are thereby avoided.

When the exposure treatment and the heat treatment are simultaneously conducted in the method according to the second aspect of the invention, the treatment can be completed in a period markedly shorter period than the exposure treatment according to the first aspect of the invention, and the productivity is thereby improved. Even when the exposure treatment and the heat treatment are separately conducted in the method according to the second aspect of the invention, the total treatment period can be shorter than the period of the exposure treatment solely conducted in the first aspect of the invention. In addition, the combination of the exposure treatment and the heat treatment as done in the second aspect of the invention is substantially free from inducing oxidation of the recording and the reflective layers in their edge portions which is likely to occur in the first aspect of the invention.

The present invention is particularly effective when the lower dielectric layer contains sulfur and other elements that adversely affect the recording layer. It should be noted that, even if sulfur and other hazardous elements are contained in the upper dielectric layer, free sulfur from the upper dielectric layer is not so problematic since the upper dielectric layer is thin, and the upper dielectric layer adjacent to the reflective layer is quickly cooled.

BRIEF DESCRIPTION OF THE DRAWINGS

These and further features of the present invention will be apparent with reference to the following description and drawings, wherein.

BEST MODE FOR CARRYING OUT THE INVENTION

Figure 1:
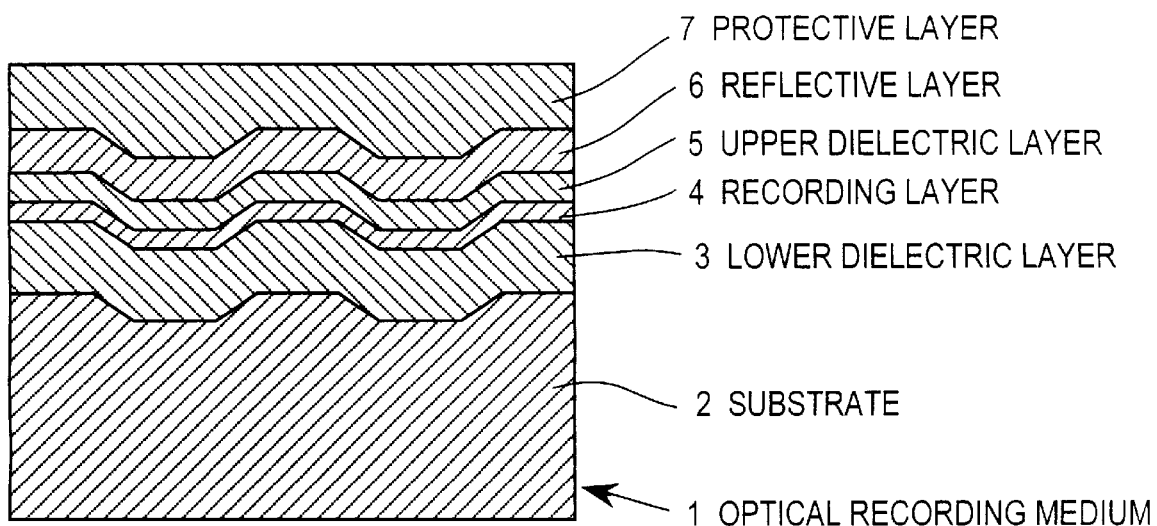
FIG. 1 is a schematic cross-sectional view of a portion of an optical recording medium according to the present invention.

Referring to FIG. 1, there is illustrated one preferred configuration of the optical recording medium according to the present invention. The optical recording medium 1 has a lower dielectric layer 3, a recording layer 4, an upper dielectric layer 5, a reflective layer 6, and a protective layer 7 on a substrate 2.

The Steps of Exposure Treatment and Heat Treatment

In the present invention, a step of exposure treatment is included between the lower dielectric layer formation and the recording layer formation. In the step of exposure treatment, the surface of the dielectric layer is exposed to an oxidative atmosphere.

According to first aspect of the present invention, the recording layer is formed after the exposure treatment. According to second aspect of the present invention, the recording layer is formed after the exposure treatment and the subsequent heat treatment, or after the exposure treatment and the heat treatment which are simultaneously carried out.

The exposure treatment is carried out in an oxidative atmosphere. The oxygen concentration of the atmosphere is not critical, and strict control of the oxygen concentration is not necessary. The exposure treatment may be carried out either in air or in an atmosphere of 100% oxygen, and the oxygen partial pressure is preferably higher than about 20%. Typical atmospheres other than air include argon plus oxygen. The exposure treatment is preferably conducted in an atmosphere of more than 0.3 Pa. Although no particular upper limit is present for the pressure of the atmosphere, there is no need to use a pressure in excess of atmospheric pressure.

According to the first aspect of the present invention, the exposure treatment is preferably carried out for a period of more than 5 minutes, and more preferably, for a period of more than 20 minutes. When the exposure period is too short, the effects of the invention are not satisfactorily realized. When the exposure treatment is carried out in an atmosphere containing moisture as in the case of open air, an exposure for excessively long period invites moisture absorption by the substrate, and when the recording layer and reflective layer are subsequently formed on the lower dielectric layer by sputtering, the edge portions of the recording and reflective layers (inner and outer edge portions in the case of an optical recording disc) are inconsistently oxidized to result in an inconsistent reflectance. Occurrence of such oxidation can be visually confirmed as discoloration in the edge portions. In the case of an optical recording disc, recording area normally extends to the vicinity of the outer edge portion, and an inconsistent reflectance in the outer edge portion is inconvenient. In order to prevent such inconsistent oxidation, the step of the exposure treatment is preferably carried out in an atmosphere at a relative humidity of up to 20%. Alternatively, when the exposure treatment is carried out in a moist atmosphere as in the case of open air, the exposure treatment is preferably conducted for a period shorter than 3 hours to prevent the oxidation of the recording and the reflective layers in their edge portions.

According to the second aspect of the present invention, the period of the exposure treatment can be markedly shortened in the embodiment wherein the heat treatment is independently conducted after the exposure treatment, and in such embodiment, even an instantaneous exposure to an oxidative atmosphere such as air may be sufficient. Occurrence of the edge oxidation of the recording and the reflective layers as mentioned above is thus prevented. Preferably, the exposure treatment in such case is effected at least for 1 second, and more preferably, for at least 10 seconds, and exposure for more than 1 minute is generally unnecessary.

In the heat treatment according to the second aspect of the present invention, the lower dielectric layer is maintained at a temperature preferably in the range of from 40 to 90° C., and more preferably in the range of from 60 to 80° C. When the heat treatment temperature is too low, the number of overwritable operations is not sufficiently increased, and the exposure treatment has to be effected for a longer period to adversely affect the productivity. When the heat treatment temperature is too high, the substrate, if it is made of a resinous material, may undergo undesirable deformation.

In the embodiment according to the second aspect of the invention wherein the exposure treatment and the heat treatment are separately carried out, the heat treatment is preferably carried out for a period of at least 1 minute, and more preferably, for a period of at least 5 minutes. Although there is no particular upper limit in the heat treatment period, the heat treatment temperature should be selected so that the heat treatment may be completed in up to 30 minutes in view of the productivity.

The heat treatment is preferably conducted in an atmosphere at a relative humidity of not more than 20% in order to avoid the inconsistent oxidation at the edge portion as described above. When the heat treatment is carried out separately from the exposure treatment, the heat treatment does not have to be conducted in an oxidative atmosphere, and may be conducted in non-oxidative atmosphere such as nitrogen or argon atmosphere.

On the other hand, when the heat treatment is carried out simultaneously with the exposure treatment, the heat treatment may be carried out after the formation of the lower dielectric layer in an oxidative atmosphere. In this case, the atmosphere used for the heat treatment may be the same as the one used in the exposure treatment in an embodiment wherein the exposure treatment is conducted separately from the heat treatment, and the treatment period may be the same as the one used for the heat treatment in an embodiment wherein the heat treatment is conducted separately from the exposure treatment.

Medium Structure

Substrate

Since the optical recording medium is adapted to be recorded and read by directing a light beam to the recording layer 4 through the substrate 2, the substrate 2 is preferably formed of a material substantially transparent to such a light beam, for example, resins and glass. Typical resins are acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

Dielectric Layers

The lower dielectric layer 3 plays the role of preventing oxidation of the recording layer 4 and protecting the substrate by shutting off the heat which can otherwise conduct from the recording layer to the substrate upon recording. The upper dielectric layer 5 plays the role of protecting the recording layer and helps the heat remaining in the recording layer after completion of recording release through heat transfer. Further the provision of both the dielectric layers is effective for improving a degree of modulation.

In the present invention, at least the lower dielectric layer 3 of the dielectric layers 3 and 5 may preferably contains zinc sulfide, ZnS. The dielectric layer containing zinc sulfide is hereinafter referred to as ZnS-containing dielectric layer. The ZnS-containing dielectric layer may preferably contain compounds other than zinc sulfide, for example, an oxide, nitride or fluoride. Preferably, such compound is at least one member selected from silicon oxides ($SiO_2$, SiO), tantalum oxide ($Ta_2O_5$), titanium oxide ($TiO_2$), lanthanum oxide ($La_2O_3$), silicon nitride ($Si_3N_4$), aluminum nitride (AlN), magnesium fluoride ($MgF_2$), sodium fluoride (NaF) and thorium fluoride ($ThF_4$). When the dielectric layer is prepared from zinc sulfide alone, the dielectric layer is excessively hard, and heat impacts in the overwriting operations may result in delamination of the dielectric layer, leading to poor rewriting durability. Inclusion of silicon oxide, silicon nitride or the like invites improvement in the rewriting durability.

The content of the zinc sulfide in the ZnS-containing dielectric layer is preferably in the range of from 50 to 95% by mole, and more preferably from 70 to 90% by mole. When the content of the zinc sulfide is insufficient, heat conductivity will be too high and refractive index will be too low, and high C/N can not be obtained. On the other hand, an excessively high zinc sulfide content results in poor rewriting durability. The content of the zinc sulfide in the dielectric layer is calculated in terms of sulfur and zinc contents measured by fluorescent X-ray analysis or the like, and for example, when the zinc content measured is in excess of the sulfur content, the excess zinc is deemed to be present in the form of a compound other than zinc sulfide, for example, ZnO.

When only the lower dielectric layer is the ZnS-containing dielectric layer, the dielectric material used for the upper dielectric layer is not limited to any particular type, and the dielectric materials as mentioned above other than the zinc sulfide or a mixture thereof as well as various transparent ceramics and various species of glass may be used. Also useful are so-called LaSiON materials containing La, Si, O, and N, so-called SiAlON materials containing Si, Al, O, and N, SiAlON containing yttrium, etc.

The lower and the upper dielectric layers may preferably have a refractive index of at least 1.4, especially at least 1.8 in the wavelength range of 400 to 850 nm. This wavelength range covers 780 nm which is the wavelength used in current CD players and 630–680 nm which is a candidate wavelength of the next generation recording technology and represents the range over which the optical recording medium having the recording layer as described below is advantageously operated.

The lower dielectric layer 3 is preferably about 500 to 3,000 Å thick, more preferably 1,000 to 2,500 Å thick. Within this thickness range, the lower dielectric layer is effective for preventing any damage to the substrate upon recording and higher modulation is available. The upper dielectric layer 5 is preferably about 100 to 300 Å, more preferably about 130 to 200 Å thick. This thickness range ensures a fast cooling rate and thus permits to define a record mark with a clear edge, resulting in reduced jitter. Also higher modulation is available.

Recording Layer

In the optical recording medium of phase change type whose dielectric layers are heated to an elevated temperature during the recording, the merit of the present invention can be realized irrespective of the composition of the recording layer, and the composition of the recording layer is not so critical. However, the present invention is effective when the optical recording medium has a recording layer of Ge-Sb-Te system or In-Ag-Te-Sb system, and in particular, when the optical recording medium has a recording layer of Ge-Sb-Te system.

Ge-Sb-Te System

In the recording layer of germanium (Ge)-antimony (Sb)-tellurium (Te) system, the atomic ratio of germanium, antimony and tellurium is preferably represented by the formula (I):

$$Ge_a Sb_b Te_{1-a-b} \quad (I)$$

wherein letters a and b are in the range: $0.08 \leq a \leq 0.25$ and $0.20 \leq b \leq 0.40$.

If the value of a is too small in formula (I), record marks are more unlikely to crystallize and the rate of erasure would be lower. If the value of a is too large, much tellurium would bond with germanium with the resultant precipitation of antimony, inhibiting formation of record marks.

If the value of b is too small, the content of tellurium would be too much and record marks are more likely to crystallize when the medium is stored at elevated temperature with a loss of reliability. If the value of b is too large, antimony would precipitate to inhibit formation of record marks.

The recording layer of this composition system preferably has a thickness of about 140 to 500 Å. A too thin recording layer would restrain the growth of a crystalline phase and provide an insufficient fluctuation of reflectance associated with a phase change. A too thick recording layer would provide a lower reflectance and a lower degree of modulation.

In-Ag-Te-Sb System

In the recording layer of silver indium (In)-silver(Ag)-tellurium (Te)-antimony (Sb) system, the atomic ratio of indium, silver, tellurium, and antimony is preferably represented by the formula (II):

$$\{(In_a Ag_b Te_{1-a-b})_{1-c} Sb_c\}_{1-d} M_d \quad (II)$$

wherein letters a, b, c and d are in the range: $0.1 \leq a \leq 0.3$, $0.1 \leq b \leq 0.3$, $0.5 \leq c \leq 0.8$, and $0 \leq d \leq 0.05$, more preferably in the range: $0.11 \leq a \leq 0.28$, $0.15 \leq b \leq 0.28$, $0.55 \leq c \leq 0.65$, and $0.005 \leq d \leq 0.05$.

If the value of a is too small in formula (II), the indium content of the recording layer will be relatively too low and record marks will become less amorphous, resulting in a lower degree of modulation and lower reliability. If the value of a is too large, the indium content of the recording layer will be relatively too high and the reflectance of regions other than record marks will become low, resulting in a lower degree of modulation.

If the value of b is too small in formula (II), the silver content of the recording layer will be relatively too low and the recrystallization of record marks and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when the medium is stored at elevated temperature, record marks crystallize more to invite drops of C/N and modulation. Additionally, the deterioration of C/N and modulation caused by repetitive recording is promoted.

If the value of a+b is too small in formula (II), tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (II), fluctuation of reflectance associated with a phase change will be sufficient, but erasure would be difficult due to markedly reduced rate of crystal transition. If the value of c is too large, fluctuation of reflectance associated with a phase change will be insufficient to invite drop of modulation.

The element M in formula II is at least one element selected from the group consisting of H, Si, C, V, W, Ta, Zn, Ti, Ce, Tb, and Y. The element M is effective for improving rewriting durability, more specifically restraining the rate of erasure from lowering as a result of repetitive rewriting. It is also effective for improving reliability under severe conditions such as hot humid conditions. At least one of V, Ta, Ce and Y is preferred among the elements M because their effects are more outstanding. V and/or Ta is more preferred, with V being most preferred.

If the value of d which stands for the content of element M is too large, fluctuation of reflectance associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (P).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectance between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the rate of erasure be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

It is noted that the recording layer of this composition system after repetitive rewriting has a coefficient of absorption k of about 3.3 in the crystalline state and about 2.2 in the microcrystalline or amorphous state.

The recording layer of this composition system preferably has a thickness of about 95 to 500 Å, more preferably about 130 to 300 Å. A too thin recording layer would restrain the growth of a crystalline phase and provide an insufficient fluctuation of reflectance associated with a phase change. If the recording layer is too thick, there would occur a phenomenon during formation of record marks that silver would diffuse in the recording layer more in a thickness direction thereof and less in an in-plane direction. As a result, the recording layer becomes less reliable. A too thick recording layer would provide a lower reflectance and a lower degree of modulation as previously mentioned.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using multi-element sputtering employing two or more targets.

Reflective Layer

The reflective layer 6 may be formed of any desired material, typically high reflectance metals, for example, Al, Au, Ag, Pt, and Cu alone or alloys containing at least one of these metals. The reflecting layer is preferably about 300 to 2,000 Å thick. Reflectance would be insufficient with a thickness below this range. A thickness beyond this range would provide no substantial improvement in reflectance and add to the cost. The reflecting layer is preferably formed by vapor deposition such as sputtering and evaporation.

Protective Layer

The protective layer 7 is provided for improving scratch resistance and corrosion resistance. Preferably the protective layer is formed of organic materials, typically radiation curable compounds or compositions thereof which are cured with radiation such as electron and UV radiation. The protective layer is generally about 0.1 to 100 μm thick and may be formed by conventional techniques such as spin coating, gravure coating, spray coating, and dipping.

Overwriting

On the optical recording medium of the invention, the rewriting is performed in a manner similar to the one described above for the phase change type optical recording medium of conventional type. The recording power may be applied in pulses. If one signal is recorded by at least two divided portions of irradiation, the heat accumulation in the record mark is suppressed. Then the dilation of the trailing edge of the record mark (known as a teardrop phenomenon) can be prevented, leading to an improved C/N. The pulse irradiation also improves the rate of erasure. The values of recording power and erasing power can be determined without undue experimentation. The reading laser beam should be of a low power so that the crystalline state of the recording layer may not be affected thereby.

When the optical recording medium of the invention is recorded, the linear velocity of the recording layer relative to the laser beam is generally about 0.8 to 20 m/s, preferably 1.2 to 16 m/s.

The light for use in the rewriting and reading of the optical recording medium of the invention may be selected in a wide wavelength range of, for example, 100 to 5,000 nm.

EXAMPLE

Examples of the present invention are given below by way of illustration and not by way of limitation.

Example 1 (According to First Aspect of the Invention)

An optical recording disc as shown in FIG. 1 was prepared by injection molding polycarbonate into a disc shaped substrate 2 having a diameter of 120 mm and a thickness of 0.6 mm. A groove was formed in one major surface of the substrate simultaneous with the injection molding. The groove had a width of 0.74 μm, a depth of 650 Å, and a pitch of 1.48 μm. On the grooved surface of the substrate, there were formed a lower dielectric layer 3, a recording layer 4, an upper dielectric layer 5, a reflective layer 6, and a protective layer 7.

The lower dielectric layer 3 was formed by sputtering a target of ZnS (80% by mole) and SiO, (20% by mole). The lower dielectric layer 3 had a thickness of 1,100 Å.

After forming the lower dielectric layer 3, the disc was taken out of the sputtering apparatus to carry out the exposure treatment, in which the lower dielectric layer 3 was exposed to an atmosphere at a temperature of 23° C. and a relative humidity of 53%. The period of the exposure treatment is shown in Table 1.

After the exposure treatment, the disc was placed in the sputtering apparatus to form the recording layer 4 of 200 Å thick. The recording layer 4 was of the composition (atomic ratio):

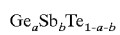

wherein a=0.22 and b=0.22.

The upper dielectric layer 5 was formed to a thickness of 250 Å by the same procedure as the lower dielectric layer 3.

The reflective layer 6 was formed to a thickness of 1500 Å by sputtering an Al-Ni target.

The protective layer 7 was formed by applying a UV curable resin by spin coating and exposing it to UV for curing. The protective layer as cured had a thickness of 5 μm.

The thus produced samples were placed in an optical recording medium evaluation system (information reproduction wavelength: 680 nm, NA: 0.6), and the samples were overwritten with 8,16 RLL signals while each samples were rotated at a linear velocity of 6 m/s at a recording power of 12.0 mW and an erasing power of 5.0 mW. The number of overwriting operations before drastic drop in C/N and jitter was recorded, and this number is shown in Table 1 as the number of overwritable operations.

The samples were also measured for reflectance along one recording track located at 57 mm from the center, and fluctuation of reflectance ΔR/Rtop was calculated from the maximum reflectance Rtop and the difference ΔR between the maximum reflectance and the minimum reflectance. The fluctuation of reflectance was evaluated in accordance with the following criteria:

○: fluctuation of reflectance, less than 5%,

Δ: fluctuation of reflectance, from 5 to 15%,

X: fluctuation of reflectance, 15% or higher.

The fluctuation of reflectance is caused by oxidation of the recording and the reflective layers in their edge portions. The results are shown in Table 1.

For comparison purpose, a comparative sample prepared by conducting no exposure treatment was evaluated as in the case of other samples. The results for the comparative sample are also shown in Table 1.

TABLE 1

| Sample No. | Exposure treatment | Number of overwritable operations | Fluctuation of reflectance |
|---|---|---|---|
| 101 (Comp.) | — | 1,000 | ○ |
| 102 | 1 min | 5,000 | ○ |
| 103 | 5 min | 10,000 | ○ |
| 104 | 20 min | 50,000 | Δ |
| 105 | 180 min | 50,000 | Δ |
| 106 | 1 week | 100,000 | × |

As shown in Table 1, number of overwritable operations drastically increases by the exposure treatment carried out after the formation of the lower dielectric layer.

It should be noted that when the exposure treatment is carried out in an atmosphere of 23° C. at a relative humidity of 10%, the fluctuation of reflectance was less than 5% even when the exposure treatment was effected for 1 week.

Example 2 (According to Second Aspect of the Invention)

The procedure of Example 1 was repeated except that a heat treatment was conducted after the exposure treatment to prepare the optical recording disc samples. The exposure treatment was carried out in an atmosphere the same as Example 1 for the period shown in Table 2, and the heat treatment was carried out in nitrogen atmosphere (relative humidity, 10%) at 70° C. for the period shown in Table 2.

The resulting samples were evaluated by repeating the procedure of Example 1. The results are shown in Table 2.

TABLE 2

| Sample No. | Exposure treatment | Heat treatment at 70° C. | Number of overwritable operations | Fluctuation of reflectance |
|---|---|---|---|---|
| 201 | 10 sec | 1 min | 10,000 | ○ |
| 202 | 10 sec | 5 min | 50,000 | ○ |
| 203 | 10 sec | 20 min | 100,000 | ○ |
| 204 | 10 sec | 60 min | 100,000 | ○ |
| 205 | 10 sec | 180 min | 100,000 | ○ |

The maximum number of overwritable operations of the samples shown in Table 2 is the same as those of the samples shown in Table 1. In the samples of the Table 1, however, an exposure of 1 week was necessary to achieve 100,000 overwritable operations, and such long exposure invited an undesirable large fluctuation of reflectance. In contrast, in the samples of Table 2, the number of overwritable operations drastically increased by conducting each of the exposure treatment and the heat treatment for a short period without inducing any significant alteration in the fluctuation of reflectance.

In the cases of the samples shown in Table 2, the exposure treatment and the heat treatment were carried out independently from each other. When the exposure treatment and the heat treatment were simultaneously conducted in dry air at a temperature of 70° C. and a relative humidity of 10% after forming the lower dielectric layer, the results were substantially equivalent with those shown in Table 2.

When the heat treatment was effected at a temperature lower than 40° C. for 1 minute, the number of overwritable operations did not reach 10,000 times. On the other hand, when the heat treatment was effected at a temperature higher than 90° C., the substrate became deformed.

Japanese Patent Application No. 14528/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer containing zinc sulfide on the substrate;

exposing the surface of the lower dielectric layer to an atmosphere containing oxygen and in excess of 0.3 Pa after forming the lower dielectric layer on the substrate;

forming the recording layer on the exposed lower dielectric layer;

forming the upper dielectric layer on the recording layer; and respectively forming the reflecting layer and the protective layer.

2. The method according to claim 1 wherein said exposure treatment is conducted for more than 5 minutes.

3. The method according to claim 2, wherein said exposure treatment is conducted at a relative humidity of up to 20% to prevent inconsistent oxidation of the recording layer.

4. The method according to claim 1 wherein said exposure treatment is conducted at a relative humidity of up to 20%.

5. The method according to claim 1 wherein said recording layer contains Ge, Sb and Te.

6. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere containing oxygen and in excess of 0.3 Pa after forming the lower dielectric layer on the substrate;

heat treating the exposed lower dielectric layer in an atmosphere without oxygen;

forming the recording layer on the lower dielectric layer; and respectively forming the reflecting layer and the protective layer.

7. The method according to claim 6 wherein said heat treatment is conducted for more than 1 minute.

8. The method according to claim 6 wherein said heat treatment is conducted at a relative humidity of up to 20%.

9. The method according to claim 6, wherein the exposure treatment is conducted at a relative humidity of up to 20% to prevent inconsistent oxidation of the recording layer.

10. The method according to claim 6, wherein the atmosphere is nitrogen or argon.

11. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere containing oxygen and in excess of 0.3 Pa after forming the lower dielectric layer on the substrate;

heat treating the exposed lower dielectric layer at a temperature of 60 to 80 degrees C.;

forming the recording layer on the lower dielectric layer; and respectively forming the reflecting layer and the protective layer.

12. The method according to claim 11, wherein said heat treatment is conducted for more than 1 minute and said exposure treatment and said heat treatment are conducted at a relative humidity of up to 20%.

13. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere containing oxygen and in excess of 0.3 Pa after forming the lower dielectric layer on the substrate;

heat treating the exposed lower dielectric layer at a temperature of 60 to 80 degrees C.;

conducting said steps of heat treating and exposing simultaneously;

forming the recording layer on the lower dielectric layer; and respectively forming the reflecting layer and the protective layer.

14. The method according to claim 13, wherein the heat treatment is conducted for more than one minute.

15. The method according to claim 13, wherein the heat treatment is conducted at a relative humidity of up to 20%.

16. The method according to claim 13, wherein the exposure humidity is conducted at a relative humidity of up to 20% to prevent inconsistent oxidation of the recording layer.

17. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere containing oxygen and in excess of 0.3 Pa after forming the lower dielectric layer on the substrate;

conducting the steps of exposing and heat treatment simultaneously;

heat treating the exposed lower dielectric layer at a temperature of 60 to 80 degrees C. for more than one minute and at a relative humidity of up to 20% to prevent inconsistent oxidation of the recording layer;

both the steps of exposing and heat treating are conducted in an atmosphere containing oxygen;

forming the recording layer on the lower dielectric layer; and respectively forming the reflecting layer and the protective layer.

18. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer containing zinc sulfide on the substrate;

exposing the surface of the lower dielectric layer to an atmosphere of air, 100% oxygen or argon plus oxygen and between 0.3 Pa and one atmosphere after forming the lower dielectric layer on the substrate;

forming the recording layer on the exposed lower dielectric layer;

forming the upper dielectric layer on the recording layer; and respectively forming the reflecting layer and the protective layer.

19. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere of air, 100% oxygen or argon plus oxygen and between 0.3 Pa and one atmosphere after forming the lower dielectric layer on the substrate;

heat treating the exposed lower dielectric layer at a temperature of 60 to 80 degrees C.;

forming the recording layer on the lower dielectric layer; and respectively forming the reflecting layer and the protective layer.

20. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere of air, 100% oxygen or argon plus oxygen and between 0.3 Pa and one atmosphere after forming the lower dielectric layer on the substrate;

heat treating the exposed lower dielectric layer at a temperature of 60 to 80 degrees C.;

conducting said steps of heat treating and exposing simultaneously;

forming the recording layer on the lower dielectric layer; and respectively forming the reflecting layer and the protective layer.

21. A method for preparing an optical recording medium comprising a substrate, a recording layer of the phase change type and the recording layer formed between a lower and an upper dielectric layer, a respective reflective layer and a protective layer, all said layers being formed in order on the substrate, comprising the steps of:

forming the lower dielectric layer on the substrate;

exposing the surface of the lower dielectric layer to an atmosphere of air, 100% oxygen or argon plus oxygen and between 0.3 Pa and one atmosphere after forming the lower dielectric layer on the substrate to prevent inconsistent oxidation of the recording layer after forming the lower dielectric layer on the substrate;

conducting the steps of exposing and heat treatment simultaneously;

heat treating the exposed lower dielectric layer at a temperature of 60 to 80 degrees C. for more than one minute and at a relative humidity of up to 20%;

both the steps of exposing and heat treating are conducted in an atmosphere containing oxygen;

forming the recording layer on the lower dielectric layer; and respectively forming the reflecting layer and the protective layer.

* * * * *